US010063670B2

(12) United States Patent
Chen et al.

(10) Patent No.: US 10,063,670 B2
(45) Date of Patent: Aug. 28, 2018

(54) ROUTE SYNCHRONIZATION METHOD AND APPARATUS

(71) Applicant: Huawei Technologies Co., Ltd., Shenzhen, Guangdong (CN)

(72) Inventors: Hao Chen, Nanjing (CN); Wei Song, Nanjing (CN); Xingfeng Jiang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 14/471,984

(22) Filed: Aug. 28, 2014

(65) Prior Publication Data

US 2015/0078201 A1    Mar. 19, 2015

(30) Foreign Application Priority Data

Sep. 18, 2013  (CN) .......................... 2013 1 0432057

(51) Int. Cl.
*H04L 29/12* (2006.01)
*H04L 29/06* (2006.01)
(Continued)

(52) U.S. Cl.
CPC .............. *H04L 69/22* (2013.01); *H04L 45/02* (2013.01); *H04L 45/44* (2013.01); *H04L 45/66* (2013.01);
(Continued)

(58) Field of Classification Search
None
See application file for complete search history.

(56) References Cited

U.S. PATENT DOCUMENTS

| 6,041,049 A * | 3/2000 | Brady ..................... H04L 45/02 370/351 |
| 2011/0135303 A1* | 6/2011 | Hufferd ................... H04L 49/00 398/45 |
| 2014/0064281 A1* | 3/2014 | Basso ................. H04L 45/7453 370/392 |

FOREIGN PATENT DOCUMENTS

CN           103051985 A       4/2013

OTHER PUBLICATIONS

INCITS working draft proposed American National Standard for Information Technology, Fibre Channel Backbone-5 (FC-BB-5), Jun. 4, 2009, American National Standards Institute, (retrieved from web.archive.org/web/20130824132008/http://fcoe.com/09-056v5.pdf), pp. 120, 127.*

(Continued)

*Primary Examiner* — Hanh N Nguyen
*Assistant Examiner* — Jose L Perez

(57) ABSTRACT

The application provides a route synchronization method and an apparatus. The method includes: receiving, by a first FEF, an entire network address request message sent by a second FEF, where the entire network address request message includes an MAC address and an FC network segment of the second FEF; parsing, by the first FEF, the entire network address request message, acquiring the MAC address and the FC network segment of the second FEF, and storing the MAC address and the FC network segment of the second FEF in a routing table of the first FEF; and sending, by the first FEF, a response message to the second FEF, where the response message includes a MAC address and an FC network segment of the first FEF. Thus, distributed routing of an FCoE network is implemented, and scalability of the FCoE network is improved.

9 Claims, 3 Drawing Sheets

(51) Int. Cl.
H04L 12/721 (2013.01)
H04L 12/751 (2013.01)
(52) U.S. Cl.
CPC ...... *H04L 61/6022* (2013.01); *H04L 61/6045* (2013.01)

(56) References Cited

OTHER PUBLICATIONS

INCUS working draft proposed American National Standard for Information Technology, Fibre Channel Backbone-5 (FC-BB-5), Jun. 4, 2009, American National Standards Institute, (retrieved from web.archive.org/web/20130824132008/http://fcoe.com/09-056v5.pdf), pp. i, 96, 100, 117.*

J. Postel, "Multi-LAN Address Resolution", Network Working Group, Oct. 1984, 15 pages.

* cited by examiner

ROUTE SYNCHRONIZATION METHOD AND APPARATUS

CROSS-REFERENCE TO RELATED APPLICATION

This application claims priority to Chinese Patent Application No. 201310432057.4, filed on Sep. 18, 2013, which is hereby incorporated by reference in its entirety.

TECHNICAL FIELD

Embodiments of the present invention relate to communications technologies, and in particular, to a route synchronization method and an apparatus.

BACKGROUND

Fiber Channel over Ethernet (FCoE) is a technology that implements network convergence. The FCoE technology enables a fiber channel (FC) and an Ethernet to share a single and integrated network infrastructure. An existing FCoE network includes a controlling FCoE forwarder (cFCF), an FCoE data-plane forwarder (FDF), and a data center bridging (DCB) network. The cFCF is responsible for collecting virtual link entry information reported by the FDF, performing route calculation in a unified manner, and sending a generated route entry to each FDF; an FDF is responsible for implementing local forwarding of an FCoE packet, establishes virtual links with the cFCF and another FDF by using a virtual adjacent (VA) port, and maintains virtual link entry information locally; and the DCB network refers to an Ethernet that includes devices supporting a data center bridging function and can transparently forward an FCoE packet.

In a route synchronization mechanism of an existing FCoE network, a cFCF needs to collect entries reported by each FDF to build a full-network topology, to calculate all routes and distribute the routes to all FDFs one by one. When the number of FDFs increases, a processing overhead of the cFCF increases; and each time the topology changes because an FDF goes online or offline, the cFCF needs to re-synchronize FC route information in the entire network. When the number of FDFs increases, an overhead used to update FC routes increases, which results in poor network scalability.

SUMMARY

Embodiments of the present invention provide a route synchronization method and an apparatus, to implement distributed routing of an FCoE network, reduce a system overhead, and improve scalability of the FCoE network.

According to a first aspect, an embodiment of the present invention provides a route synchronization method, where the method includes:

receiving, by a first FCoE edge forwarder (FEF), an entire network address request message sent by a second FEF, where the entire network address request message includes a media access control MAC address and a fiber channel FC network segment of the second FEF;

parsing, by the first FEF, the entire network address request message, acquiring the MAC address and the FC network segment of the second FEF, and storing the MAC address and the FC network segment of the second FEF in a routing table of the first FEF; and returning, by the first FEF, a response message to the second FEF, where the response message includes a MAC address and an FC network segment of the first FEF.

With reference to the first aspect, in a first possible implementation manner of the first aspect, before the receiving, by the first FEF, an entire network address request message sent by the second FEF, the method further includes:

sending, by the first FEF, a first address notification message, where the first address notification message includes the MAC address and the FC network segment of the first FEF.

With reference to the first possible implementation manner of the first aspect, in a second possible implementation manner of the first aspect, the method further includes:

receiving, by the first FEF, a second address notification message sent by a third FEF, where the second address notification message includes a MAC address and an FC network segment of the third FEF; and parsing, by the first FEF, the second address notification message, acquiring the MAC address and the FC network segment of the third FEF, and storing the MAC address and the FC network segment of the third FEF in the routing table of the first FEF.

With reference to any one of the first aspect and the first to the second possible implementation manner of the first aspect, in a third possible implementation manner of the first aspect, the method further includes:

sending, by the first FEF, a destination address request message, where the destination address request message includes an FC address of a target device and the MAC address and the FC network segment of the first FEF;

receiving, by the first FEF, a destination address request response message returned by a fourth FEF communicated with the target device by using FCoE technology, where the destination address request response message includes a MAC address and an FC network segment of the fourth FEF; and parsing, by the first FEF, the destination address request response message, acquiring the MAC address and the FC network segment of the fourth FEF, and storing the MAC address and the FC network segment of the fourth FEF in the routing table of the first FEF.

With reference to any one of the first aspect and the first to the third possible implementation manners of the first aspect, in a fourth possible implementation manner of the first aspect, the method further includes:

receiving, by the first FEF, an address deletion message sent by the second FEF; and deleting, by the first FEF according to the address deletion message, the MAC address and the FC network segment of the second FEF from the routing table of the first FEF.

According to a second aspect, the embodiment of the present invention provides a first fiber channel over Ethernet edge forwarder FEF, where the first FEF includes:

a receiving module, configured to receive an entire network address request message sent by a second FEF, where the entire network address request message includes a media access control MAC address and a fiber channel FC network segment of the second FEF;

a processing module, configured to parse the entire network address request message that is received by the receiving module, acquire the MAC address and the FC network segment of the second FEF, and store the MAC address and the FC network segment of the second FEF in a routing table of the first FEF; and a sending module, configured to return a response message to the second FEF, where the response message includes a MAC address and an FC network segment of the first FEF.

With reference to the second aspect, in a first possible implementation manner of the second aspect, the sending module is further configured to send a first address notification message before the receiving module receives the entire network address request message sent by the second FEF, where the first address notification message includes the MAC address and the FC network segment of the first FEF.

With reference to the first possible implementation manner of the second aspect, in a second possible implementation manner, the receiving module is further configured to receive a second address notification message sent by a third FEF, where the second address notification message includes a MAC address and an FC network segment of the third FEF; and the processing module is further configured to parse the second address notification message received by the receiving module, acquire the MAC address and the FC network segment of the third FEF, and store the MAC address and the FC network segment of the third FEF in the routing table of the first FEF.

With reference to any one of the second aspect and the first to the second possible implementation manner of the second aspect, in a third possible implementation manner of the second aspect, the sending module is further configured to send a destination address request message, where the destination address request message includes an FC address of a target device and the MAC address and the FC network segment of the first FEF;

the receiving module is further configured to receive a destination address request response message returned by a fourth FEF communicated with the target device by using FCoE technology, where the destination address request response message includes a MAC address and an FC network segment of the fourth FEF; and the processing module is further configured to parse the destination address request response message received by the receiving module, acquire the MAC address and the FC network segment of the fourth FEF, and store the MAC address and the FC network segment of the fourth FEF in the routing table of the first FEF.

With reference to any one of the second aspect and the first to the third possible implementation manners of the second aspect, in a fourth possible implementation manner of the second aspect, the receiving module is further configured to receive an address deletion message sent by the second FEF; and the processing module is further configured to delete the MAC address and the FC network segment of the second FEF from the routing table of the first FEF according to the address deletion message received by the receiving module.

According to the route synchronization method and the apparatus provided in the embodiments of the present invention, an FEF that newly goes online sends an entire network address request message to the other FEFs in an FCoE network through multicasting, where the message carries address information of the FEF, so that the other FEFs store information in the entire network address request message in local routing tables and return response messages carrying their addresses to the FEF that newly goes online. The FEF that newly goes online acquires the addresses of the other FEFs by parsing the response messages and stores the addresses in a local routing table. There is no need to separately set a dedicated centralized control device to perform network-wide topology information collection and route synchronization. This implements on-demand route synchronization for the FEF that newly goes online, avoids a high network overhead caused by frequent synchronization of routing table information in the entire network. In this way, distributed routing of an FCoE network is implemented, and scalability of the FCoE network is improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In a traditional FCoE network, a dedicated device (for example, a cFCF) is set to calculate and synchronize routes in the entire network, to implement a route synchronization mechanism for FCoE switches. The cFCF is responsible for calculating all routes in a unified manner and distributing the routes to all FDFs one by one. For this purpose, the cFCF needs to collect content of entries reported by each FDF in the FCoE network. When the number of FDFs increases, a processing overhead of the cFCF increases; and each time the FCoE network topology changes because an FDF goes online or offline, the cFCF needs to re-synchronize route information in the entire network. The cFCF needs to re-collect topology information about all the FDFs, recalculate routes, and distribute the routes to each FDF. When the number of FDFs increases, a calculation amount of route information synchronization and an overhead used to collect and transmit packets increase, resulting in poor network scalability. To overcome the foregoing technical defect, the present invention provides a route synchronization method: In an FCoE network, control planes of various FEFs interacts to complete a route calculation and synchronization process. There is no need to set a dedicated centralized control device to perform network-wide topology collection and route calculation and synchronization. In addition, the FEFs respectively store and maintain their local routing tables, and network-wide routing table information synchronization is only required during network initialization. After the network initialization is completed, when an FEF goes online or offline, routes are synchronized on demand, and only the FEF that goes online or offline needs to send a route synchronization message to a peer FEF that communicates with the FEF. This avoids a high network overhead caused by frequent synchronization of routing table information in the entire network, implements distributed routing of an FCoE network, and improves scalability of the FCoE network.

Figure 1:
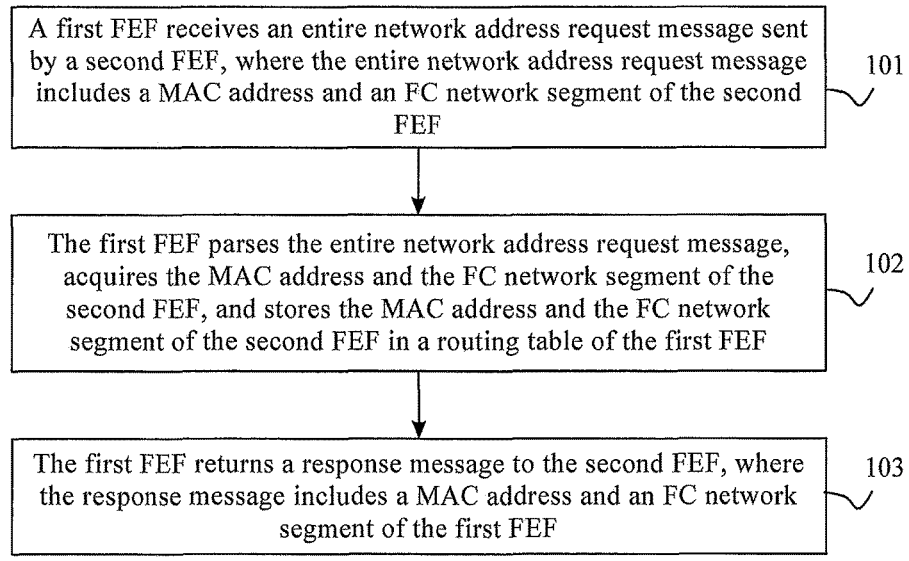
FIG. 1 is a flowchart of a route synchronization method according to an embodiment of the present invention.

FIG. 1 is a flowchart of a route synchronization method according to an embodiment of the present invention. The method may be used in a scenario in which an FEF needs to synchronize routes in an FCoE network. As shown in FIG. 1, the method includes:

101. A first FEF receives an entire network address request message sent by a second FEF, where the entire network address request message includes a media access control (MAC) address and an FC network segment of the second FEF.

102. The first FEF parses the entire network address request message, acquires the MAC address and the FC network segment of the second FEF, and stores the MAC address and the FC network segment of the second FEF in a routing table of the first FEF.

103. The first FEF returns a response message to the second FEF, where the response message includes a MAC address and an FC network segment of the first FEF.

Specifically, both the first FEF and the second FEF are network devices in the FCoE network, where the first FEF is in an online running state, the second FEF newly goes online, and the routing table of the first FEF is used to store route information of the first FEF and other FEFs in the FCoE network. When the FCoE network runs, the second FEF that newly goes online synchronizes routes on demand to acquire addresses of other FEFs.

According to the route synchronization method provided in the embodiment of the present invention, an FEF that newly goes online sends an entire network address request message to other FEFs in an FCoE network through multicasting, where the entire network address request message carries an address of the FEF that newly goes online, so that the other FEFs store information in the entire network address request message in local routing tables and return response messages carrying their addresses to the FEF that newly goes online. The FEF that newly goes online acquires the addresses of the other FEFs by parsing the response messages and stores the addresses in a local routing table. There is no need to separately set a dedicated centralized control device to perform network-wide topology collection and route calculation and synchronization. This implements on-demand route synchronization for the FEF that newly goes online, avoids a high network overhead caused by frequent synchronization of routing table information in the entire network. In this way, distributed routing of an FCoE network is implemented, and scalability of the FCoE network is improved.

On the basis of the foregoing embodiment, before the receiving, by the first FEF, an entire network address request message sent by the second FEF, the method further includes:

sending, by the first FEF, a first address notification message, where the first address notification message includes the MAC address and the FC network segment of the first FEF and is used by the first FEF to notify the other FEFs of address information during network initialization.

Further, the method may further include:

receiving, by the first FEF, a second address notification message sent by a third FEF, where the second address notification message includes a MAC address and an FC network segment of the third FEF, indicates that the network includes the third FEF in addition to the first FEF during network initialization, and is sent by the third FEF to notify the other FEFs of address information; and parsing, by the first FEF, the second address notification message, acquiring the MAC address and the FC network segment of the third FEF, and storing the MAC address and the FC network segment of the third FEF in the routing table of the first FEF.

Specifically, both the first FEF and the third FEF are network devices that are in an online running state and in the FCoE network. During network initialization, entries of local routing tables of source FEFs (the first FEF and the third FEF) are empty. The source FEFs actively send address notification messages carrying address information of the source FEFs to the other FEFs in the FCoE network in a multicasting/broadcasting manner, where the address information of the source FEFs includes MAC addresses and FC network segments of the source FEFs.

According to the route synchronization method provided in the embodiment of the present invention, each source FEF actively sends address notification messages carrying address information of the source FEF to other FEFs in an FCoE network, so that the other FEFs that receive the address notification message store information in the address notification message in local routing tables. There is no need to separately set a dedicated centralized control device to perform network-wide topology collection and route calculation and synchronization. This implements distributed routing of the FCoE network and improves scalability of the FCoE network.

On the basis of the foregoing embodiment, when the network is running, if information in the local routing table of the first FEF is lost due to an exception, to ensure communication between the first FEF and a target device, the route synchronization method further includes:

1) sending, by the first FEF, a destination address request message, where the destination address request message includes an FC address of the target device and the MAC address and the FC network segment of the first FEF;

2) receiving, by the first FEF, a destination address request response message returned by a fourth FEF communicated with the target device by using FCoE technology, where the destination address request response message includes a MAC address and an FC network segment of the fourth FEF; and 3) parsing, by the first FEF, the destination address request response message, acquiring the MAC address and the FC network segment of the fourth FEF, and storing the MAC address and the FC network segment of the fourth FEF in the routing table of the first FEF.

Specifically, it is assumed that the information in the local routing table of the first FEF is lost due to an exception, for example, route information of the other FEFs in the local routing table of the first FEF is lost. When needing to communicate with the target device, the first FEF first needs to acquire information about a route to the target device. A process of acquiring route information is an on-demand learning process: The first FEF sends a destination address request message to the other FEFs, where the destination address request message includes the FC address of the target device. Among all FEFs that receive the destination address request message, only the fourth FEF communicated with the destination address by using FCoE technology and responds to the destination address request message. After receiving the destination address request message, the fourth FEF, in place of the target device, sends a destination address request response message to the first FEF through unicasting, where the destination address request response message carries address information of the fourth FEF. The first FEF acquires information about an FC network segment in which the target device is located and stores the FC network segment of the fourth FEF in the routing table of the first FEF.

According to the route synchronization method provided in the embodiment of the present invention, a first FEF sends a destination address request message to the other FEFs in an FCoE network through multicasting, where the destination address request message carries an FC address of a target device and receives a destination address request response message returned by an FEF communicated with the target device by using FCoE technology, where the destination address request response message carries address information of the interconnected FEF. There is no need to separately set a dedicated centralized control device to perform network-wide topology collection and route calculation and synchronization. This implements on-demand route synchronization for an FEF, avoids a high network overhead caused by frequent synchronization of routing table information in the entire network. In this way, distributed routing of an FCoE network is implemented, and scalability of the FCoE network is improved.

On the basis of the foregoing embodiment, when the network runs, when the second FEF needs to go offline, the second FEF first needs to send an address deletion message to other FEFs in the FCoE network to instruct the other FEFs to delete address information related to the second FEF; and the route synchronization method further includes:

1) receiving, by the first FEF, an address deletion message sent by the second FEF; and 2) deleting, by the first FEF according to the address deletion message, the MAC address and the FC network segment of the second FEF from the routing table of the first FEF.

According to the route synchronization method provided in the embodiment of the present invention, an FEF that needs to go offline sends an address deletion message to other FEFs in an FCoE network to instruct the other FEFs to delete address information related to the FEF that needs to go offline. There is no need to separately set a dedicated centralized control device to perform network-wide topology collection and route calculation and synchronization. This implements on-demand route synchronization for an FEF, avoids a high network overhead caused by frequent synchronization of routing table information in the entire network. In this way, distributed routing of an FCoE network is implemented, and scalability of the FCoE network is improved.

Figure 2:
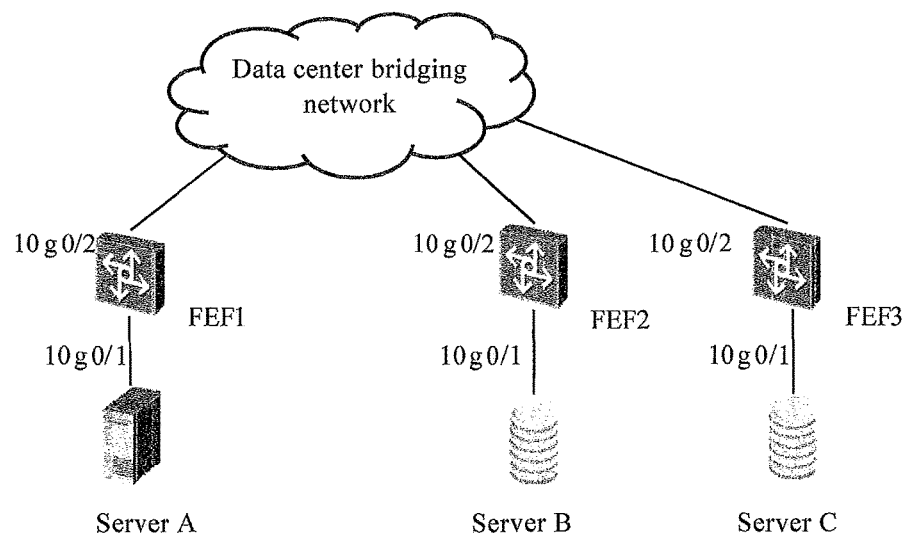
FIG. 2 is a schematic networking diagram of an FCoE network according to an embodiment of the present invention.

On the basis of the foregoing embodiment, for example, FIG. 2 shows a networking scenario of an FCoE network. FIG. 2 is a schematic networking diagram of the FCoE network according to an embodiment of the present invention. As shown in FIG. 2, networking devices include: an FEF1, an FEF2, a DCB network, a server (Server A), and storage devices (Storage) B and Storage C. The FEFs are interconnected through DCB network devices; FC network segments of the FEF1, FEF2, and FEF3 are respectively 1.0.0/8, 2.0.0/8, and 3.0.0/8; MAC addresses of the FEF1, FEF2, and FEF3 are respectively FEF-MAC1, FEF-MAC2, and FEF-MAC3; the Server A connects to port 1 (port number: 10 g 0/1) of the FEF1 by using a converged network adapter (Converged Network Adapter, CNA for short) and acquires an FC address (FC ID) 1.1.1/24 by registering with the FEF1; the Storage B connects to port 1 (port number: 10 g 0/1) of the FEF2 and acquires an FC ID 2.1.1/24 by registering with the FEF2; the Storage C connects to port 1 (port number: 10 g 0/1) of the FEF3 and acquires an FC ID 3.1.1/24 by registering with the FEF3; and MAC addresses of the Server A, Storage B, and Storage C are respectively MAC-A, MAC-B, and MAC-C. To implement normal data transmission, a local routing table of each FEF includes a mapping relationship between an FC address of a destination FEF (or destination FC network segments), an outbound port number of the FEF, and an MAC address of the destination FEF. Each FEF needs to generate and maintain the local routing table by calculating and synchronizing routes. The FEF1 is used for example. Assuming that the FEF1, FEF2, and FEF3 are in an online running state, the routing table of the FEF1 is shown in Table 1. The first row of Table 1 records information about a route from the FEF1 to the FEF2, including the FC network segment (2.0.0/8) and the MAC address (FEF-MAC2) of the FEF2 and an outbound port number (10 g 0/2) of the FEF1. The second row of Table 1 records information about a route from the FEF1 to the FEF3, including the FC network segment (3.0.0/8) and the MAC address (FEF-MAC2) of the FEF3 and the outbound port number (10 g 0/2) of the FEF1.

TABLE 1

| Routing table of the FEF1 | | |
|---|---|---|
| FC network segment of a destination FEF | Outbound port number of a source FEF | MAC address of the destination FEF |
| 2.0.0/8 | 10 g 0/2 | FEF-MAC2 |
| 3.0.0/8 | 10 g 0/2 | FEF-MAC3 |

It should be noted that FIG. 2 only exemplarily shows a networking diagram of a scenario in which route synchronization is required in an FCoE network. The embodiment of the present invention does not specifically limit the number of networking devices, relative positions, and connection relationships.

On the basis of the foregoing embodiment, the following describes the technical solutions of the present invention by using specific embodiments with reference to FIG. 2.

According to the route synchronization method provided in the embodiment of the present invention, route synchronization for an FEF may include at least two processes: an active notification process and an on-demand learning process. The active notification process occurs during network initialization. In this case, entries of a local routing table of each FEF are empty, and each FEF actively notifies other FEFs in an FCoE network of route information of the FEF. The on-demand learning process occurs when the network runs, which is intended for a scenario in which an FEF goes online or offline.

Figure 3:
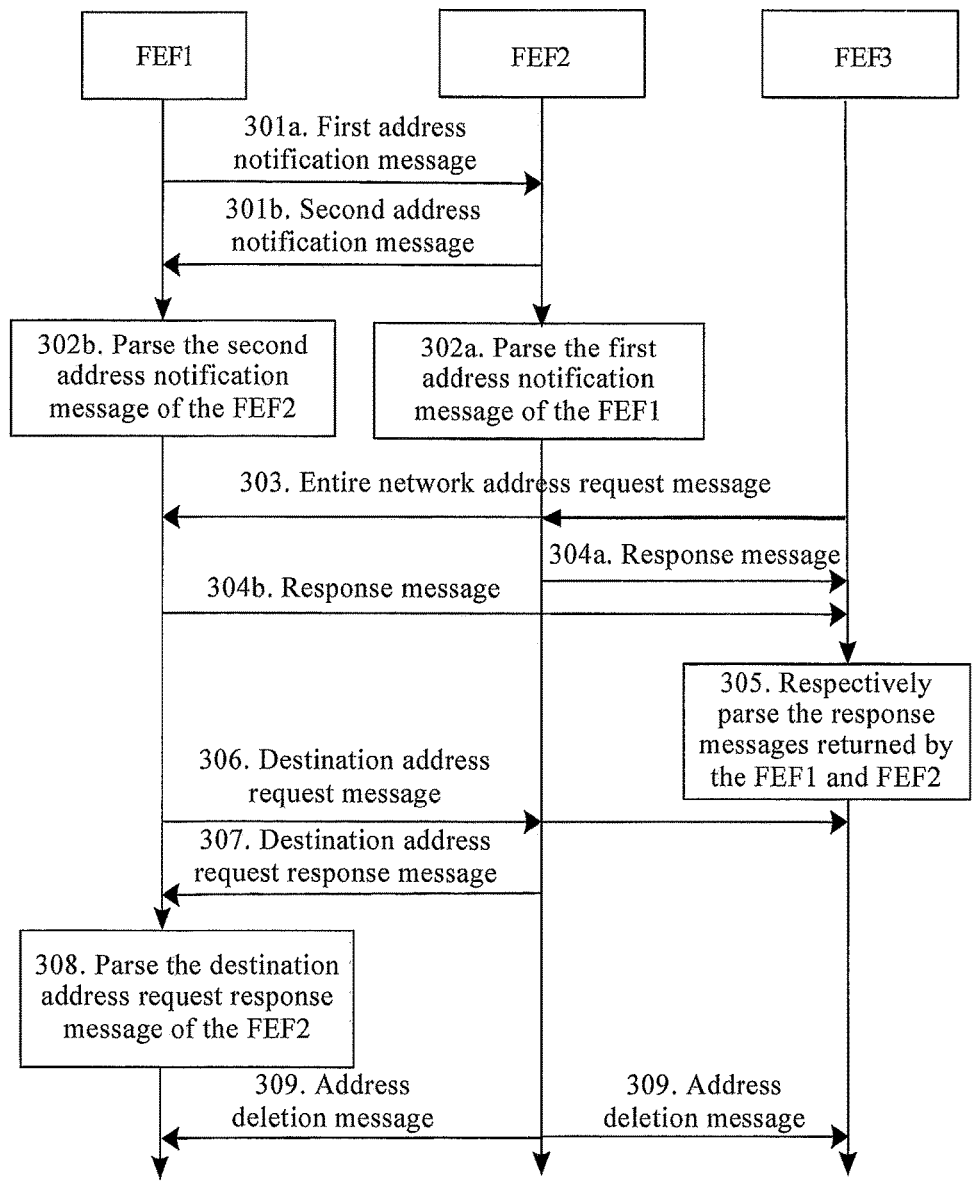
FIG. 3 is a signaling diagram of a route synchronization method according to an embodiment of the present invention.

FIG. 3 is a signaling diagram of a route synchronization method according to an embodiment of the present invention. The method is implemented with cooperation of the FEF1, FEF2, and FEF3, where FEFs that go online during network initialization are the FEF1 and FEF2, the FEF3 goes online at time t1 in the process of network running, and the FEF2 goes offline at time t2. As shown in FIG. 3, the method includes:

301a. The FEF1 sends a first address notification message carrying the MAC address and the FC network segment of the FEF1.

301b. The FEF2 sends a second address notification message carrying the MAC address and the FC network segment of the FEF2.

302a. The FEF2 parses the first address notification message sent by the FEF1, acquires the MAC address and the FC network segment of the FEF1, and stores the MAC address and the FC network segment of the FEF1 in the routing table of the FEF2.

302b. The FEF1 parses the second address notification message sent by the FEF2, acquires the MAC address and the FC network segment of the FEF2, and stores the MAC address and the FC network segment of the FEF2 in the routing table of the FEF1.

Specifically, the FEFs that go online during network initialization are the FEF1 and FEF2. The FEF1 and FEF2 respectively send address notification messages to other FEFs in the FCoE network through multicasting/broadcasting. The FEF1 is used for example. The first address notification message generated by the FEF1 includes a source MAC field, a source FC address/source FC network segment field, a destination MAC field, and a destination FC address/destination. FC network segment field, where the source MAC field is the MAC address (FEF-MAC1) of the FEF1 and the source FC address/source FC network segment field is the FC network segment (1.0.0/8) of the FEF1. Because the first address notification message sent by the FEF1 is a multicast/broadcast message and the FEF1 does not know address information of a destination FEF, the destination MAC field is set to all zero, and the destination FC address/destination FC network segment field and the source FC address/FC network segment are set to a same value to indicate that the first address notification message is an active notification message. An FEF that receives the first address notification message stores information in the first address notification message in a routing table of the FEF. The FEF1 and FEF2 are used for example. The destination MAC field in the first address notification message generated by the FEF1 is all zero (00:00:00:00:00:00), and the destination FC address/destination FC network segment field and the source FC address/source FC network segment field are the same, namely the FC network segment (1.0.0/8) of the FEF1. Table 2 shows the first address notification message generated by the FEF1, where the source MAC field is the MAC address (FEF-MAC1) of the FEF1, both the source FC address/source FC network segment field and the destination FC address/destination FC network segment are the FC network segment (1.0.0/8) of the FEF1, and the destination MAC field is all zero.

TABLE 2

First address notification message of the FEF1

| | |
|---|---|
| Source MAC | FEF-MAC1 |
| Source FC address/source FC network segment | 1.0.0/8 |
| Destination MAC | 00:00:00:00:00:00 |
| Destination FC address/destination FC network segment | 1.0.0/8 |

After receiving the first address notification message sent by the FEF1, the FEF2 parses the first address notification message and acquires information in the first address notification message. If the FEF2 finds that the destination FC address/destination FC network segment and the source FC address/source FC network segment in the first address notification message are the same, the FEF2 learns that the first address notification message is an active notification message and stores the information in the first address notification message in the routing table of the FEF2. It is understandable that an FEF that receives the active notification message does not need to return a response message to the source FEF. The routing table of the FEF2 also stores information about the Storage B that is directly connected to the FEF2, for example, the MAC address (MAC-B) and the FC ID (2.1.1/24) of the Storage B and the port number (10 g 0/1) of port 1 (VF port) of the FEF2 communicated with the Storage B (VN port) by using FCoE technology. Table 3 shows the routing table of the FEF2. The first row of Table 3 records information about a route from the FEF2 to the Storage B, including the FC ID (2.1.1/24) and the MAC address (MAC-B) of the Storage B. The second row of Table 3 records information about a route from the FEF2 to the FEF1, including the FC network segment (1.0.0/8) and the MAC address (FEF-MAC1) of the FEF1 and the outbound port number (10 g 0/2) of the FEF2.

TABLE 3

Routing table of the FEF2

| FC network segment of a destination FEF | Outbound port number of a source FEF | MAC address of the destination FEF |
|---|---|---|
| 2.1.1/24 | 10 g 0/1 | MAC-B |
| 1.0.0/8 | 10 g 0/2 | FEF-MAC1 |

303. The FEF3 (an FEF that newly goes online) sends an entire network address request message through multicasting, where the entire network address request message carries the MAC address and the FC network segment of the FEF3.

304a. The FEF2 parses the entire network address request message, acquires the MAC address and the FC network segment of the FEF3, and stores the MAC address and the FC network segment of the FEF3 in the routing table of the FEF2; and returns a response message carrying the MAC address and the FC network segment of the FEF2 to the FEF3.

304b. The FEF1 parses the entire network address request message, acquires the MAC address and the FC network segment of the FEF3, and stores the MAC address and the FC network segment of the FEF3 in the routing table of the FEF3; and returns a response message carrying the MAC address and the FC network segment of the FEF1 to the FEF3.

305. The FEF3 respectively parses the response messages returned by the FEF1 and FEF2, acquires the MAC addresses and the FC network segments of the FEF1 and FEF2, and stores the MAC addresses and the FC network segments of the FEF1 and FEF2 in the routing table of the FEF3.

Specifically, when the network is running, the FEF3 goes online. The FEF3 that newly goes online needs to acquire address information of the other FEFs and synchronize routes as required. The FEF3 generates and sends an entire network address request message, where the entire network address request message includes a source MAC field, a source FC address/source FC network segment field, a destination MAC field, and a destination FC address/destination FC network segment field. Because the FEF3 does not know the addresses of the other FEFs, the destination MAC field in the entire network address request message is set to all zero, and the destination FC address/destination FC network segment field is set to all one (ff.ff.ff/0) to indicate that the entire network address request message is an on-demand learning message. After receiving the entire network address request message, the other FEFs (for example, the FEF1 and FEF2) store information in the message in their routing tables and return response messages carrying their addresses to the FEF3 that newly goes online through unicasting. After receiving the entire network address request message sent by the FEF3, the FEF1 and FEF2 separately reply to the message through unicasting. Table 4 shows the entire network address request message sent by the FEF3, where the source MAC field is the MAC address (FEF-MAC3) of the FEF3, the source FC address/source FC network segment field is the FC network segment (3.0.0/8) of the FEF3, the destination MAC field is all zero, and the destination FC address/destination FC network segment field is all one (ff.ff.ff/0).

TABLE 4

Entire network address request message sent by the FEF3

| | |
|---|---|
| Source MAC | FEF-MAC3 |
| Source FC address/source FC network segment | 3.0.0/8 |
| Destination MAC | 00:00:00:00:00:00 |
| Destination FC address/destination FC network segment | ff.ff.ff/0 |

Table 5 shows the response message of the FEF1, where the source MAC field is the MAC address (FEF-MAC1) of the FEF1, the source FC address/source FC network segment field is the FC network segment (1.0.0/8) of the FEF1, the destination MAC field is the MAC address (FEF-MAC3) of the FEF3, and the destination FC address/destination FC network segment field is the FC network segment (3.0.0/8) of the FEF3.

TABLE 5

Response message of the FEF1

| | |
|---|---|
| Source MAC | FEF-MAC1 |
| Source FC address/source FC network segment | 1.0.0/8 |
| Destination MAC | FEF-MAC3 |
| Destination FC address/destination FC network segment | 3.0.0/8 |

Table 6 shows the response message of the FEF2, where the source MAC field is the MAC address (FEF-MAC2) of the FEF2, the source FC address/source FC network segment field is the FC network segment (2.0.0/8) of the FEF2, the destination MAC field is the MAC address (FEF-MAG3) of the FEF3, and the destination FC address/destination FC network segment field is the FC network segment (3.0.0/8) of the FEF3.

TABLE 6

Response message of the FEF2

| | |
|---|---|
| Source MAC | FEF-MAC2 |
| Source FC address/source FC network segment | 2.0.0/8 |
| Destination MAC | FEF-MAC3 |
| Destination FC address/destination FC network segment | 3.0.0/8 |

Further, after the FEF that newly goes online (FEF3) acquires the address information of the other FEFs by means of on-demand route synchronization, the Storage C registers with the FEF3 and the FEF3 completes registration of the Storage C. Table 7-1 shows the routing table of the FEF1 in this case. The first row of Table 7-1 records information about a route from the FEF1 to the Server A, including the FC ID (1.1.1/24) and the MAC address (MAC-A) of the Server A and the outbound port number (10 g 0/1) of the FEF1. The second row of Table 7-1 records information about a route from the FEF1 to the FEF2, including the FC network segment (2.0.0/8) and the MAC address (FEF-MAC2) of the FEF2 and the outbound port number (10 g 0/2) of the FEF1. The third row of Table 7-1 records information about a route from the FEF1 to the FEF3, including the FC network segment (3.0.0/8) and the MAC address (FEF-MAC3) of the FEF3 and the outbound port number (10 g 0/2) of the FEF1.

TABLE 7-1

Routing table of the FEF1

| FC network segment of a destination FEF | Outbound port number of a source FEF | MAC address of the destination FEF |
|---|---|---|
| 1.1.1/24 | 10 g 0/1 | MAC-A |
| 2.0.0/8 | 10 g 0/2 | FEF-MAC2 |
| 3.0.0/8 | 10 g 0/2 | FEF-MAC3 |

Table 7-2 shows the routing table of the FEF2. The first row of Table 7-2 records information about a route from the FEF2 to the Storage B, including the FC ID (2.1.1/24) and the MAC address (MAC-B) of the Storage B and the outbound port number (10 g 0/1) of the FEF2. The second row of Table 7-2 records information about a route from the FEF2 to the FEF1, including the FC network segment (1.0.0/8) and the MAC address (FEF-MAC1) of the FEF1 and the outbound port number (10 g 0/2) of the FEF2. The third row of Table 7-2 records information about a route from the FEF2 to the FEF3, including the FC network segment (3.0.0/8) and the MAC address (FEF-MACS) of the FEF3 and the outbound port number (10 g 0/2) of the FEF2.

TABLE 7-2

Routing table of the FEF2

| FC network segment of a destination FEF | Outbound port number of a source FEF | MAC address of the destination FEF |
|---|---|---|
| 2.1.1/24 | 10 g 0/1 | MAC-B |
| 1.0.0/8 | 10 g 0/2 | FEF-MAC1 |
| 3.0.0/8 | 10 g 0/2 | FEF-MAC3 |

Table 7-3 shows the routing table of the FEF3. The first row of Table 7-3 records information about a route from the FEF3 to the Storage C, including the FC ID (3.1.1/24) and the MAC address (MAC-C) of the Storage B and the outbound port number (10 g 0/1) of the FEF3. The second row of Table 7-3 records information about a route from the FEF3 to the FEF1, including the FC network segment (1.0.0/8) and the MAC address (FEF-MAC1) of the FEF1 and the outbound port number (10 g 0/2) of the FEF3. The third row of Table 7-3 records information about a route from the FEF3 to the FEF2, including the FC network segment (2.0.0/8) and the MAC address (FEF-MAC2) of the FEF2 and the outbound port number (10 g 0/2) of the FEF3.

TABLE 7-3

Routing table of the FEF3

| FC network segment of a destination FEF | Outbound port number of a source FEF | MAC address of the destination FEF |
|---|---|---|
| 3.1.1/24 | 10 g 0/1 | MAC-C |
| 1.0.0/8 | 10 g 0/2 | FEF-MAC1 |
| 2.0.0/8 | 10 g 0/2 | FEF-MAC2 |

306. The FEF1 sends a destination address request message carrying an FC address of a target device through multicasting.

307. The FEF2 returns a destination address request response message carrying the MAC address and the FC network segment of the FEF2 to the FEF1.

308. The FEF1 parses the destination address request response message, acquires the MAC address and the FC network segment of the FEF2, and stores the MAC address and the FC network segment of the FEF2 in the routing table of FEF1.

Specifically, when the network is running, information recorded in the routing table of the FEF1 is lost due to an exception. When the FEF1 needs to communicate with a target device (for example, the Storage B), the FEF1 needs to acquire information about a route to the Storage B: The FEF1 sends a destination address request message carrying an FC address of the target device to the other FEFs through multicasting/broadcasting, where the destination address request message includes a source MAC field, a source FC address/source FC network segment field, a destination MAC field, and a destination FC address/destination FC network segment field. Because the FEF1 does not know addresses of the other FEFs, the destination MAC field in the destination address request message is set to all zero (00:00:00:00:00:00) and the destination FC address/destination FC network segment field is set to the FC address of the Storage B to indicate that the destination address request message is used to acquire an entry of a route to the Storage B. Table 8 shows the destination address request message sent by the FEF1, where the source MAC field is the MAC address (FEF-MAC1) of the FEF1, the source FC address/source FC network segment field is the FC network segment (1.0.0/8) of the FEF1, the destination MAC field is all 0s, and the destination FC address/destination FC network segment field is the FC address (2.1.1/24) of the Storage B.

TABLE 8

Destination address request message of the FEF1

| Source MAC | FEF-MAC1 |
|---|---|
| Source FC address/source FC network segment | 1.0.0/8 |
| Destination MAC | 00:00:00:00:00:00 |
| Destination FC address/destination FC network segment | 2.1.1/24 |

After receiving the destination address request message, the FEF2 communicated with the Storage B by using FCoE technology, determines, according to the destination FC address/destination FC network segment field that is set to the FC address of the Storage B, that the destination address request message sent by the FEF1 is intended for acquiring an entry of a route to the Storage B. The FEF2 replies in place of the Storage B: The FEF2 sends a destination address request response message carrying address information of the FEF2 to the FEF1 through unicasting, so that the FEF1 acquires an FC network segment in which the Storage B is located. Table 9 shows the destination address request response message sent by the FEF2, where the source MAC field is the MAC address (FEF-MAC2) of the FEF2, the source FC address/source FC network segment field is the FC network segment (2.0.0/8) of the FEF2, the destination MAC field is the MAC address (FEF-MAC1) of the FEF1, and the destination FC address/destination FC network segment field is the FC network segment (1.0.0/8) of the FEF1.

TABLE 9

Destination address request response message of the FEF2

| Source MAC | FEF-MAC2 |
|---|---|
| Source FC address/source FC network segment | 2.0.0/8 |
| Destination MAC | FEF-MAC1 |
| Destination FC address/destination FC network segment | 1.0.0/8 |

After receiving the destination address request response message sent by the FEF2, the FEF1 stores the FC network segment and the MAC address of the FEF2 in the routing table of the FEF1.

309. The FEF2 sends an address deletion message through multicasting, so that the FEF1 and FEF3 respectively delete the MAC address and the FC network segment of the FEF2 from local routing tables.

Specifically, according to application requirements, when the FEF2 and Storage B need to go offline when the network is running, the FEF2 first sends an address deletion message to the other FEFs in the FCoE network to instruct the other FEFs to delete address information related to the FEF2: The FEF2 sends an address deletion message through multicasting, where the address deletion message includes a deletion instruction field, a source MAC field, a source FC address/source FC network segment field, a destination MAC field, and a destination FC address/destination FC network segment field. The deletion instruction field is used to instruct the destination FEF to delete the address information related to the FEF2 from a routing table of the destination FEF; and the source MAC field is the MAC address of the FEF2, the source FC address/source FC network segment field is the FC network segment of the FEF2, the destination MAC field is the MAC address of the destination FEF, and the destination FC address/destination FC network segment field is the FC network segment of the destination FEF. In practice, the deletion instruction field may be implemented by setting a flag bit, Del_Flag, in an FCoE Initialization Protocol (FIP) packet descriptor to 1 in the prior art.

After receiving the address deletion message, the FEF1 and FEF3 delete the MAC address and the FC network segment of the FEF2 from their routing tables, and then the routing table of the FEF1 is shown in Table 10-1. The first row of Table 10-1 records information about a route from the FEF1 to the Server A, including the FC ID (1.1.1/24) and the MAC address (MAC-A) of the Server A and the outbound port number (10 g 0/1) of the FEF1. The second row of Table 10-1 records information about a route from the FEF1 to the FEF3, including the FC network segment (3.0.0/8) and the MAC address (FEF-MAC3) of the FEF3 and the outbound port number (10 g 0/2) of the FEF1.

TABLE 10-1

Routing table of the FEF1

| FC network segment of a destination FEF | Outbound port number of a source FEF | MAC address of the destination FEF |
|---|---|---|
| 1.1.1/24 | 10 g 0/1 | MAC-A |
| 3.0.0/8 | 10 g 0/2 | FEF-MAC3 |

Table 10-2 shows the routing table of the FEF3. The first row of Table 10-2 records information about a route from the FEF3 to the Storage C, including the FC ID (3.1.1/24) and the MAC address (MAC-C) of the Storage C. The second row of Table 10-2 records information about a route from the FEF3 to the FEF1, including the FC network segment (1.0.0/8) and the MAC address (FEF-MAC1) of the FEF1 and the outbound port number (10 g 0/2) of the FEF3.

TABLE 10-2

Routing table of the FEF3

| FC network segment of a destination FEF | Outbound port number of a source FEF | MAC address of the destination FEF |
|---|---|---|
| 3.1.1/24 | 10 g 0/1 | MAC-C |
| 1.0.0/8 | 10 g 0/2 | FEF-MAC1 |

In practice, a packet format of the entire network address request message, the response message, the address notification message, the destination address request message, the destination address request response message, and the address deletion message in the foregoing embodiments may be a format of an FIP descriptor in the prior art, for example, a protocol packet type (Type) field of the entire network address request message, the address notification message, the destination address request message, and the address deletion message may be set to 239 and the Type field of the response message and the destination address request response message may be set to 240.

Figure 4:
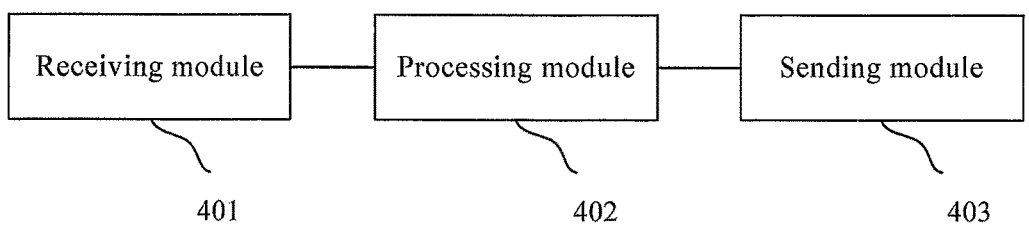
FIG. 4 is a schematic structural diagram of a first FEF according to an embodiment of the present invention.

FIG. 4 is a schematic structural diagram of a first fiber channel over Ethernet edge forwarder FEF according to an embodiment of the present invention. As shown in FIG. 4, a first FEF 400 according to the embodiment of the present invention includes a receiving module 401, a processing module 402, and a sending module 403, where:

the first receiving module 401 is configured to receive an entire network address request message sent by a second FEF, where the entire network address request message includes a media access control MAC address and a fiber channel FC network segment of the second FEF;

the processing module 402 is configured to parse the entire network address request message that is received by the receiving module 401, acquire the MAC address and the FC network segment of the second FEF, and store the MAC address and the FC network segment of the second FEF in a routing table of the first FEF 400; and the sending module 403 is configured to return a response message to the second FEF, where the response message includes a MAC address and an FC network segment of the first FEF 400.

The first FEF 400 according to the embodiment of the present invention may be configured to execute a technical solution of the route synchronization method embodiment shown in FIG. 1. Implementation principles and technical effects thereof are similar. For specific details, reference may be made to the route synchronization method embodiment shown in FIG. 1, and details are not described herein again.

Optionally, the sending module 403 is further configured to send a first address notification message before the receiving module 401 receives the entire network address request message sent by the second FEF, where the first address notification message includes the MAC address and the FC network segment of the first FEF 400.

Optionally, the receiving module 401 is further configured to receive a second address notification message sent by a third FEF, where the second address notification message includes a MAC address and an FC network segment of the third FEF; and the processing module 402 is further configured to parse the second address notification message received by the receiving module 401, acquire the MAC address and the FC network segment of the third FEF, and store the MAC address and the FC network segment of the third FEF in the routing table of the first FEF 400.

Optionally, the sending module 403 is further configured to send a destination address request message, where the destination address request message includes an FC address of a target device and the MAC address and the FC network segment of the first FEF 400;

the receiving module 401 is further configured to receive a destination address request response message returned by a fourth FEF communicated with the target device by using FCoE technology, where the destination address request response message includes a MAC address and an FC network segment of the fourth FEF; and the processing module 402 is further configured to parse the destination address request response message received by the receiving module 401, acquire the MAC address and the FC network segment of the fourth FEF, and store the MAC address and the FC network segment of the fourth FEF in the routing table of the first FEF 400.

Optionally, the receiving module 401 is further configured to receive an address deletion message sent by the second FEF; and the processing module 402 is further configured to delete the MAC address and the FC network segment of the second FEF from the routing table of the first FEF 400 according to the address deletion message received by the receiving module 401.

Figure 5:
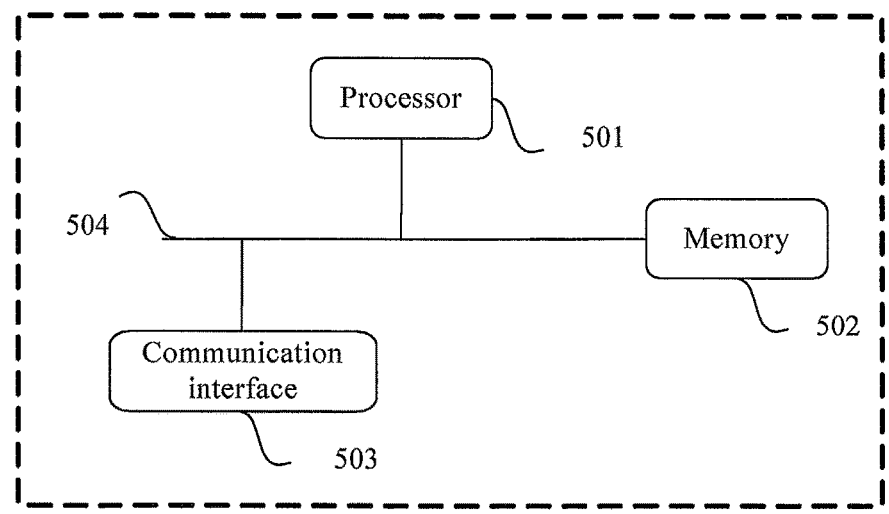
FIG. 5 is another schematic structural diagram of a first FEF according to an embodiment of the present invention.

FIG. 5 is another schematic structural diagram of a first fiber channel over Ethernet edge forwarder FEF according to an embodiment of the present invention. As shown in FIG. 5, the first FEF 500 according to the embodiment of the present invention includes a processor 501, a memory 502, a communication interface 503, and a bus 504, where the processor 501, the memory 502, and the communication interface 503 are interconnected through the bus 504.

The foregoing processor 501 may be a general-purpose processor, including a central processing unit (CPU) or a network processor (NP); and may also be a digital signal processor (DSP), an application specific integrated circuit (ASIC), a field programmable gate array (FPGA), or another programmable logical device or a discrete hardware assembly.

The memory 502 is configured to store a program. Specifically, the program may include program code, where the program code includes a computer operation instruction. The memory 502 may include a high-speed RAM or a non-volatile memory, for example, at least one disk memory.

The communication interface 503 is configured for the first FEF 500 to communicate with another device; packets can be sent and received through the communication interface 503.

When the first FEF 500 is running, the processor 501 communicates with the memory 502, and executes the program stored in the memory 502 and the route synchronization method according to the embodiment of the present invention. The method includes:

receiving an entire network address request message sent by a second FEF, where the entire network address request message includes a media access control MAC address and an FC network segment of the second FEF;

parsing the entire network address request message, acquiring the MAC address and the FC network segment of the second FEF, and storing the MAC address and the FC network segment of the second FEF in a routing table of the first FEF 500; and returning a response message to the second FEF, where the response message includes the MAC address and the FC network segment of the first FEF 500.

Further, the memory 502 is further configured to store the routing table of the first FEF 500.

Optionally, before the receiving an entire network address request message sent by a second FEF, the method further includes:

sending a first address notification message, where the first address notification message includes the MAC address and the FC network segment of the first FEF 500;

and further optionally includes:

receiving a second address notification message sent by a third FEF, where the second address notification message includes a MAC address and an FC network segment of the third FEF; and parsing the third address notification message, acquiring the MAC address and the FC network segment of the third FEF, and storing the MAC address and the FC network segment of the third FEF in the routing table of the first FEF 500.

Optionally, the method further includes:

sending a destination address request message, where the destination address request message includes an FC address of a target device and the MAC address and the FC network segment of the first FEF 500;

receiving a destination address request response message returned by a fourth FEF communicated with the target device by using FCoE technology, where the destination address request response message includes a MAC address and an FC network segment of the fourth FEF; and parsing the destination address request response message, acquiring the MAC address and the FC network segment of the fourth FEF, and storing the MAC address and the FC network segment of the fourth FEF in the routing table of the first FEF 500.

Optionally, the method further includes:

receiving an address deletion message sent by the second FEF; and deleting the MAC address and the FC network segment of the second FEF from the routing table of the first FEF 500 according to the address deletion message.

In the several embodiments provided in the present invention, it should be understood that the disclosed apparatus and method may be implemented in other manners. For example, the described apparatus embodiment is merely exemplary. For example, the unit division is merely a logical function division and may be other divisions in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, only division of the foregoing functional modules is described by using examples. In practice, the foregoing functions may be allocated to and completed by different functional modules as required, that is, an internal structure of the device is divided into different functional modules to complete all or a part of functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A route synchronization method performed by a first Fiber Channel over Ethernet (FCoE) edge forwarder (FEF) in an FCoE network, comprising:

receiving an entire network address request message multicasted by a second FEF when the second FEF goes online, wherein a source media access control (MAC) field of the entire network address request message is a MAC address of the second FEF, and a source fiber channel (FC) address/source FC network segment field of the entire network address request message is an FC network segment of the second FEF, wherein a destination MAC field of the entire network address request message is set to all zero and a destination FC address/destination FC network segment field of the entire network address request message is set to all one to indicate that the entire network address request message is an on-demand learning message for learning address information of FEFs in the FCoE network;

parsing the entire network address request message to acquire the MAC address of the second FEF and the FC network segment of the second FEF, and storing a mapping relationship between the MAC address of the second FEF, an outbound port number of the first FEF, and the FC network segment of the second FEF in a routing table of the first FEF to record a route from the first FEF to the FC network segment of the second FEF;

based on the indication that the entire network address request message is an on-demand learning message for learning address information of FEFs in the FCoE network, returning a response message to the second FEF in response to the entire network address request message, such that the second FEF acquires address information of the first FEF, wherein a source MAC field of the response message is a MAC address of the first FEF, a source FC address/source FC network segment field of the response message is an FC network segment of the first FEF, a destination MAC field of the response message is the MAC address of the second FEF, and a destination FC address/destination FC network segment field of the response message is the FC network segment of the second FEF;

multicasting a destination address request message, wherein a source MAC field of the destination address request message is the MAC address of the first FEF, and a source FC address/source FC network segment field of the destination address request message is the FC network segment of the first FEF, wherein a destination MAC field of the destination address request message is set to all zero and a destination FC address/destination FC network segment field of the destination address request message is set to an FC address of a target device to indicate that the destination address request message is to acquire a route to the target device;

receiving a destination address request response message that is in response to the destination address request message and returned by a fourth FEF to which the target device connects, wherein a source MAC field of the destination address request response message is a MAC address of the fourth FEF, and a source FC address/source FC network segment field of the destination address request response message is an FC network segment of the fourth FEF, wherein a destination MAC field of the destination address request response message is the MAC address of the first FEF, and a destination FC address/destination FC network segment field of the destination address request response message is the FC network segment of the first FEF, wherein the FC address of the target device belongs to the FC network segment of the fourth FEF; and parsing the destination address request response message to acquire the MAC address of the fourth FEF and the FC network segment of the fourth FEF, and storing the MAC address of the fourth FEF, the outbound port number of the first FEF and the FC network segment of the fourth FEF in the routing table of the first FEF to record a route from the first FEF to the FC network segment of the fourth FEF.

2. The method according to claim 1, wherein before receiving the entire network address request message sent by the second FEF, the method further comprises:
sending a first address notification message, wherein the first address notification message comprises the MAC address and the FC network segment of the first FEF.

3. The method according to claim 2, further comprising:
receiving a second address notification message sent by a third FEF, wherein the second address notification message comprises a MAC address and an FC network segment of the third FEF; and
parsing the second address notification message to acquire the MAC address and the FC network segment of the third FEF, and storing the MAC address and the FC network segment of the third FEF in the routing table of the first FEF to record a route from the first FEF to the third FEF.

4. The method according to claim 1, further comprising:
receiving an address deletion message sent by the second FEF; and
deleting according to the address deletion message, the MAC address of the second FEF and the FC network segment of the second FEF from the routing table of the first FEF.

5. A first Fiber Channel over Ethernet (FCoE) edge forwarder (FEF) in an FCoE network, comprising:
a processor; and
memory coupled to the processor, the memory comprising instructions that, when executed by the processor, cause the first FEF to:
receive an entire network address request message multicasted by a second FEF when the second FEF goes online, wherein a source media access control (MAC) field of the entire network address request message is a MAC address of the second FEF, a source fiber channel (FC) address/source FC network segment field of the entire network address request message is an FC network segment of the second FEF, a destination MAC field of the entire network address request message is set to all zero and a destination FC address/destination FC network segment field of the entire network address request message is set to all one to indicate that the entire network address request message is an on-demand learning message for learning address information of FEFs in the FCoE network;
parse the entire network address request message to acquire the MAC address and the FC network segment of the second FEF, and store a mapping relationship between the FC network segment of the second FEF, an outbound port number of the first FEF and the MAC address of the second FEF in a routing table of the first FEF to record a route from the first FEF to the FC network segment of the second FEF;
based on the indication that the entire network address request message is an on-demand learning message for learning address information of FEFs in the FCoE network, return a response message to the second FEF in response to the entire network address request message, such that the second FEF acquires address information of the first FEF, wherein a source MAC field of the response message is a MAC address of the first FEF, a source FC address/source FC network segment field of the response message is an FC network segment of the first FEF, a destination MAC field of the response message is the MAC address of the second FEF, and a destination FC address/destination FC network segment field of the response message is the FC network segment of the second FEF;

multicast a destination address request message, wherein a source MAC field of the destination address request message is the MAC address of the first FEF, and a source FC address/source FC network segment field of the destination address request message is the FC network segment of the first FEF, wherein a destination MAC field of the destination address request message is set to all zero and a destination FC address/destination FC network segment field of the destination address request message is set to an FC address of a target device to indicate that the destination address request message is to acquire a route to the target device;

receive a destination address request response message that is in response to the destination address request message and returned by a fourth FEF to which the target device connects, wherein a source MAC field of the destination address request response message is a MAC address of the fourth FEF, and a source FC address/source FC network segment field of the destination address request response message is an FC network segment of the fourth FEF, a destination MAC field of the destination address request response message is the MAC address of the first FEF, and a destination FC address/destination FC network segment field of the destination address request response message is the FC network segment of the first FEF, wherein the FC address of the target device belongs to the FC network segment of the fourth FEF; and parse the destination address request response message to acquire the MAC address of the fourth FEF and the FC network segment of the fourth FEF, and store the MAC address of the fourth FEF, the outbound port number of the first FEF and the FC network segment of the fourth FEF in the routing table of the first FEF to record a route from the first FEF to the FC network segment of the fourth FEF.

6. The first FEF according to claim 5, wherein the memory further comprises instructions that, when executed by the processor, cause the first FEF, before receiving the entire network address request message sent by the second FEF, to:

send a first address notification message, wherein the first address notification message comprises the MAC address and the FC network segment of the first FEF.

7. The first FEF according to claim 6, wherein the memory further comprises instructions that, when executed by the processor, cause the first FEF to:

receive a second address notification message sent by a third FEF, wherein the second address notification message comprises a MAC address and an FC network segment of the third FEF; and parse the second address notification message to acquire the MAC address and the FC network segment of the third FEF, and store the MAC address and the FC network segment of the third FEF in the routing table of the first FEF to record a route from the first FEF to the FC network segment of the third FEF.

8. The first FEF according to claim 5, wherein the memory further comprises instructions that, when executed by the processor, cause the first FEF to:

receive an address deletion message sent by the second FEF; and delete the MAC address and the FC network segment of the second FEF from the routing table of the first FEF according to the address deletion message received by the receiving module.

9. A Fiber Channel over Ethernet (FCoE) network, comprising:

a first FCoE edge forwarder (FEF), comprising:
a first processor; and
first memory coupled to the first processor, the first memory comprising instructions that, when executed by the first processor, cause the first FEF to:

receive an entire network address request message sent by a second FEF, wherein a source media access control (MAC) field of the entire network address request message is a MAC address of the second FEF, a source fiber channel (FC) address/source FC network segment field of the entire network address request message is an FC network segment of the second FEF, wherein a destination MAC field of the entire network address request message is set to all zero and a destination FC address/destination FC network segment field of the entire network address request message is set to all one to indicate that the entire network address request message is an on-demand learning message for learning address information of FEFs in the FCoE network;

parse the entire network address request message to acquire the MAC address and the FC network segment of the second FEF, and store a mapping relationship between the FC network segment of the second FEF, an outbound port number of the first FEF and the MAC address of the second FEF in a routing table of the first FEF to record a route from the first FEF to the FC network segment of the second FEF;

based on the indication that the entire network address request message is an on-demand learning message for learning address information of FEFs in the FCoE network, return a response message to the second FEF in response to the entire network address request message, such that the second FEF acquires address information of the first FEF, wherein a source MAC field of the response message is a MAC address of the first FEF, a source FC address/source FC network segment field of the response message is an FC network segment of the first FEF, a destination MAC field of the response message is the MAC address of the second FEF, and a destination FC address/destination FC network segment field of the response message is the FC network segment of the second FEF;

multicast a destination address request message, wherein a source MAC field of the destination address request message is the MAC address of the first FEF, and a source FC address/source FC network segment field of the destination address request message is the FC network segment of the first FEF, wherein a destination MAC field of the destination address request message is set to all zero, and a destination FC address/destination FC network segment field of the destination address request message is set to an FC address of a target device to indicate that the destination address request message is to acquire a route to the target device;

receive a destination address request response message that is in response to the destination address request message and returned by a fourth FEF to which the target device connects, wherein the FC address of the target device belongs to the FC network segment of the fourth FEF, wherein a source MAC field of the destination address request response message is a MAC address of the fourth FEF, and a source FC address/source FC network segment field of the destination address request response message is an FC network segment of the fourth FEF, wherein a destination MAC field of the destination address request response message is the MAC address of the first FEF, and a destination FC address/destination FC network segment field of the destination address request response message is the FC network segment of the first FEF; and parse the destination address request response message to acquire the MAC address of the fourth FEF and the FC network segment of the fourth FEF, and store the MAC address of the fourth FEF, the outbound port number of the first FEF and the FC network segment of the fourth FEF in the routing table of the first FEF to record a route from the first FEF to the FC network segment of the fourth FEF;

the second FEF, comprising:
  a second processor; and
  second memory coupled to the second processor, the second memory comprising instructions that, when executed by the second processor, cause the second FEF to:
    multicast the entire network address request message when the second FEF goes online;
    receive the response message returned by the first FEF; and
    parse the response message to acquire the MAC address of the first FEF and the FC network segment of the first FEF, and store a mapping relationship between the MAC address of the first FEF, an outbound port number of the second FEF, and the FC network segment of the first FEF in a routing table of the second FEF to record a route from the second FEF to the FC network segment of first FEF; and the fourth FEF, comprising:
  a fourth processor; and
  fourth memory coupled to the fourth processor, the fourth memory comprising instructions that, when executed by the fourth processor, cause the fourth FEF to:
    receive the destination address request message multicast by the first FEF;
    determine, according to the destination FC address/destination FC network segment field of the destination address request message, that the destination address request message is intended for acquiring a route to the target device connecting to the fourth FEF; and
    reply in place of the target device by sending the destination address request response message to the first FEF.

* * * * *